United States Patent [19]

Nelson

[11] 3,970,735

[45] July 20, 1976

[54] MOLDING METHOD FOR SPLICING ELECTRICAL CABLE

[75] Inventor: Arthur L. Nelson, La Jolla, Calif.

[73] Assignee: Townsend and Townsend, San Francisco, Calif.

[22] Filed: Jan. 31, 1975

[21] Appl. No.: 545,948

Related U.S. Application Data

[63] Continuation of Ser. No. 355,421, April 30, 1973, abandoned, which is a continuation of Ser. No. 115,150, Feb. 26, 1971, abandoned.

[52] U.S. Cl................................ 264/272; 264/263; 264/275
[51] Int. Cl.² ............................................ B29C 6/00
[58] Field of Search............................. 264/263, 272

[56] References Cited
UNITED STATES PATENTS

| | | | |
|---|---|---|---|
| 2,716,623 | 8/1955 | Tator ................................ | 264/263 |
| 2,768,105 | 10/1956 | Dittmore.......................... | 29/628 X |
| 3,384,931 | 5/1968 | Cochran .......................... | 264/328 |
| 3,671,622 | 6/1972 | Humphries....................... | 264/263 |

Primary Examiner—Richard R. Kucia
Attorney, Agent, or Firm—Townsend and Townsend

[57] ABSTRACT

A method for making splices in high voltage electrical cable and particularly for replacing relatively short sections of previously removed, original insulation. Ends of the original insulation adjoining the section are tapered and fresh insulating material is placed over the section and heated to fluidize it. Pressure is applied to intimately combine the original cable insulation and the newly added splice insulation to thereby effect an interfacing of the original and newly added insulating material. The new insulating material is placed inside the cavity of a mold which includes small apertures communicating the cavity with the exterior and being spaced over the length of the cavity. The fresh insulating material is pressurized by forcing additional material into the cavity to thereby vent entrapped air through the apertures to the exterior. Some of the apertures are selectively opened and closed to effect the venting while propagating the insulating material and the applied pressure throughout the cavity.

2 Claims, 11 Drawing Figures

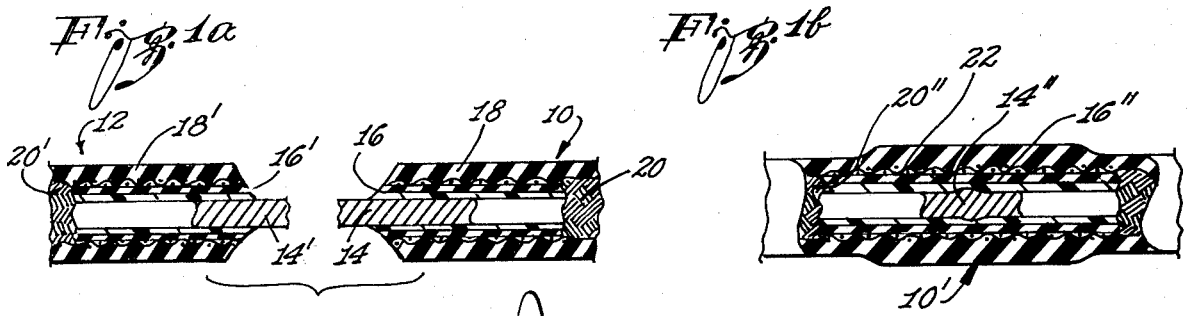
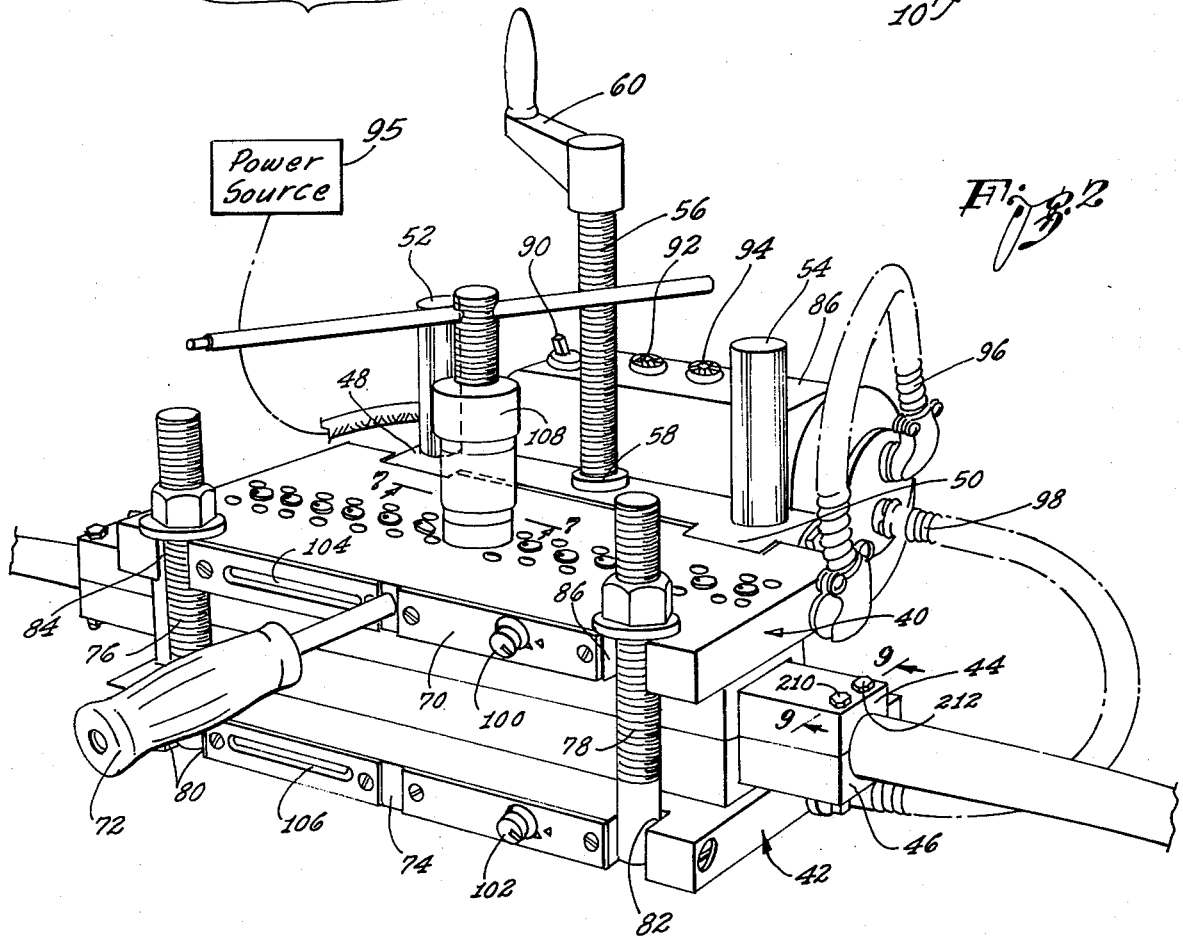
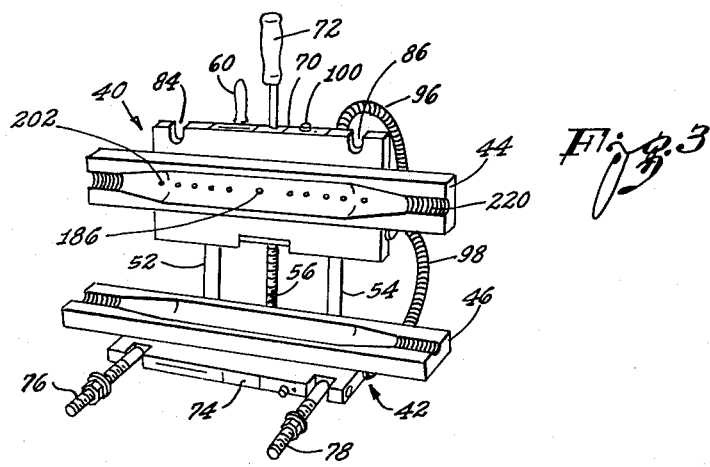

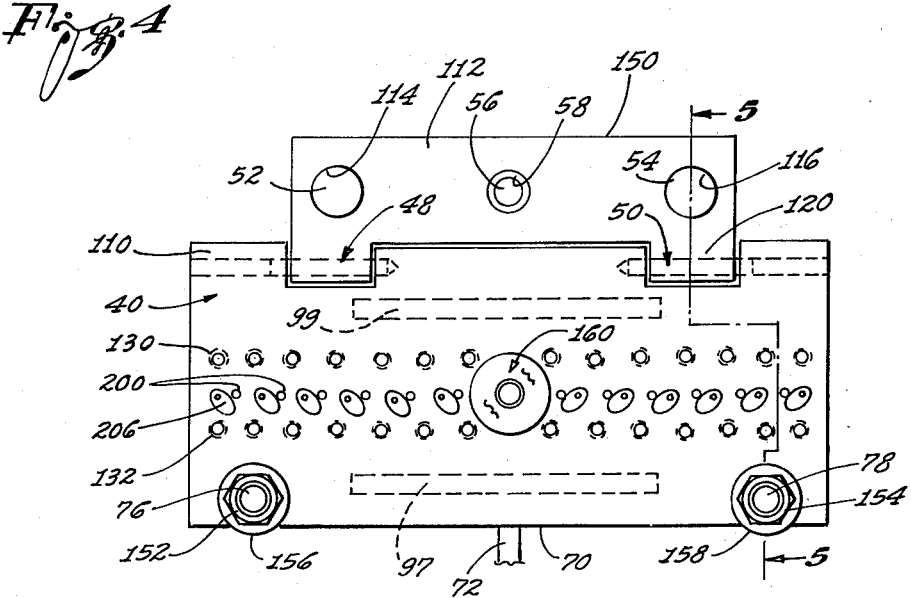
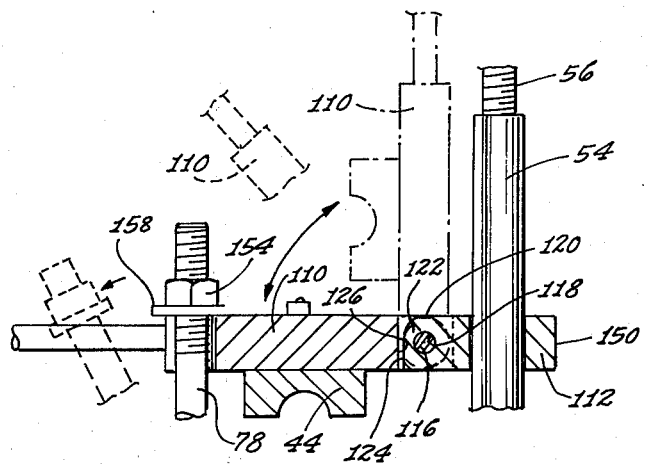
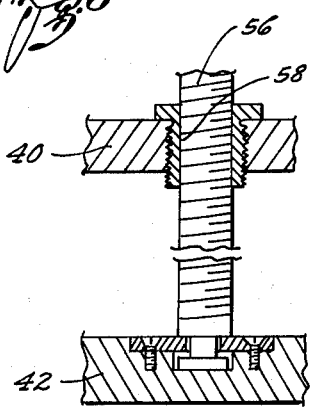
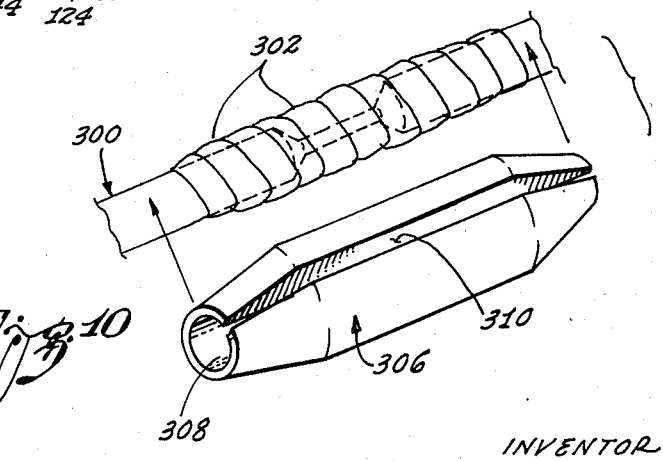

INVENTOR:
Arthur L. Nelson

BY JOSEPH L. GOLANT
ATTORNEY

MOLDING METHOD FOR SPLICING ELECTRICAL CABLE

RELATED APPLICATIONS

This application is a continuation application of the co-pending application bearing Ser. No. 355,421, filed Apr. 30, 1973 for MOLDING APPARATUS AND METHOD FOR USING SAME now abandoned, which is a continuation application of U.S. Pat. application bearing Ser. No. 115,150, filed Feb. 26, 1971, now abandoned.

BACKGROUND OF THE INVENTION

1. Field of the Invention

The present invention relates to a molding method and, more particularly, to an improved molding method, especially adapted for splicing high voltage electrical cable in a reliable and efficient manner.

2. Description of the Prior Art

Relatively low voltage electrical cable generally consists of one or more centrally disposed electrically conductive cores or wires surrounded by a layer of electrically insulative material. Primarily, the insulative material is to protect against electrical shock and against short circuiting. At times, it becomes necessary to connect another segment of electrical cable to an existing cable; this is commonly referred to as a "splice." For low voltage cable, often splicing simply entails connecting the conductive cores together and covering the cores with insulative material, such as insulative tape.

With the ever increasing requirements for more power, higher and higher voltages are being transmitted along electrical cables; of these, underground cables require reliable insulation. For many years oil-filled cables fulfilled the insulation requirements. However, oil-filled cables are expensive to manufacture, to install and to maintain. In recent years, high voltage cables having solid dielectric materials have been developed. These materials include polyethylene, cross-linked polyethylene and ethylene propylene rubber (EPR). Using these materials, some cables have been designed to transmit voltages as high as 138 kilovolts. High voltage cables, however, present some difficult problems when compared to low voltage cables since there is a far greater propensity for failure due to a short circuit. Should there be an imperfection in the high voltage cable's conductive core, an excess charge will build up at the imperfection and create a corona discharge; that is, there will be a discharge through the insulative material into the surrounding environment. The imperfection is more generally referred to as a "discontinuity." For example, if a copper wire is used as the electrically conductive core, any burr or scratch on the wire surface will serve as a discontinuity and initiate a corona discharge. Such a discharge is usually fatal to the cable since there will be a progressively increasing amount of dielectric stress generated in the insulative material until failure occurs.

One method for solving the problem of corona discharge is to provide a layer of semi-conductive material about the conductive core. This semi-conductive layer may be partially of synthetic resin which will allow it to be molded about the conductive core so as to present a relatively smooth outer surface along which the high voltage charge will travel. Splicing high voltage cable, however, is very difficult since any discontinuity introduced by the splicing process may engender a corona discharge. One common problem is the introduction of entrapped air; the entrapped air forms a discontinuity and may cause a corona discharge. Two basic requirements for a reliable high voltge splice are first, that the added insulating material be compatible with the original insulating material and, second, that the added insulating material have a dielectric constant similar to the dielectric constant of the original insulating material. To be otherwise risks the creation of a discontinuity or "electrical interface" along which ionization may take place or water may enter. In the high voltage hand-taped splices, an attempt is made to minimize this effect by making long tapers, that is "penciling" the cable insulative material prior to splicing to increase the length of a potential ionization path.

In addition to the technical problems involved, any system developed to prevent discontinuities during splicing should be a relatively economical one. For example, excessively high labor costs, such as those required when a highly specialized talent is necessary to operate the system, or any system which is not adaptble to portable field usage will never meet the requirements deemed necessary.

A traditional method for splicing low voltage cables using a molding device required the spliced section to be covered with an excessive amount of electrically insulative unvulcanized material usually in tape form. Next, the mold would be placed around the spliced area and heat and pressure applied; however, because of over packing, the molding device could not be fully closed thereby allowing the unvulcanized material to flow outwardly between the mold halves. This movement from a high pressure region to a low pressure region created a tension force on the conductive core causing the core to move. A misalignment due to the movement presents little problem for low voltage cables; but such a misalignment could present major problems for high voltage cables by creating discontinuities, and in some cases prevent the conductive core from receiving a complete covering of insulative material. The molding device also tended to entrap air which is inevitably included with each turn of the unvulcanized insulative tape. There is no egress through which this entrapped air may escape. Once again, the effect on high voltage cables of entrapped air is far different than the effect on low voltage cables. Hence, such a molding device is not suitable for high voltage splicing.

Another splicing technique for low voltage cables consisted simply of hand taping insulative material about the conductive core. While results for low voltage cables were satisfactory, problems and expense increased as the technique was applied to higher voltage cables. First, it became necessary to make long "pencils" or tapers prior to splicing to increase the potential ionization path thereby lessening the chance of a path developing; second, the taping process was time consuming, laborious and gave unreliable results.

A newer system developed for higher voltage cables comprised the use of a plastic mold placed about the spliced section to act as a container for a liquid insulative material which is then poured into the mold. Since neither sufficient heat nor pressure is used, bonding is totally unrealiable so that water leakage is enhanced, and the likelihood of air bubble discontinuities is great. As mentioned, water leakage or air bubbles will cause a short circuit and failure of the cable.

Still another method developed for high voltage cables comprised wrapping insulative tape about the slice, covering this tape with a mylar tape and surrounding the splice with steel bands. Next, heating blankets were applied in an attempt to fuse the insulative tape. Problems with this method included long time periods to accomplish, on the order of 12 hours, extreme expense, the inevitable inclusion of air bubbles and an inability to function with some types of insulative materials such as elastomers.

SUMMARY OF THE INVENTION

The present invention solves the above-mentioned problems while achieving an economically feasible system by providing a method for insulating electrical cable, and particularly short sections or splices of uninsulated cable, comprising the steps of providing an electrical cable to be insulated; covering a selected portion of the cable with electrically insulating material; placing the cable portion within a mold cavity; applying heat and adding additional insulation material to the mold cavity to increase pressure and expunge entrapped gas about the selected portion of the cable; and selectively allowing heated insulating material and entrapped gas to escape from the mold cavity.

Sufficient heat is applied to fluidize the additional insulating material, that is to soften it to such an extent that it flows under pressure. Portions of the existing insulation contiguous to the uninsulated sections of cable are thereby also heated and fluidized or softened. To form a high quality splice capable of enduring high voltage service without premature failure of the newly formed insulation there must be a secure bond or homogeneous interface between the newly added insulation and the existing insulation. When using common insulating materials for the cable and the splice, such as cross-linked polyethylene and/or EPR, the application of heat and pressure, and the resulting softening of the insulating material, appears to cause a certain amount of molecular interchange, that is of intermixing or overlapping of the original and the newly added insulating materials' molecules. There also appears to be a limited cross-linking at the interface between the two insulating materials. Upon cooling, an excellent bond is thus established which, for the purposes of this application, is sometimes referred to as a "molecular bond." Applicant believes that the formation of this molecular bond is to a large extent responsible for the excellent results achieved with the method of the present invention, that is, for the absence of discontinuities or non-uniformities at the interface between the existing and the newly added insulation material so that the development of potential ionization paths and possible water entry are prevented. The danger of insulation failures at high voltage cable splices is thereby greatly reduced or eliminated.

It is the general aim of the present invention to provide a molding method to produce superior and reliable splices of electrical cables quickly, simply and at relatively low cost.

Another aspect of the present invention is to provide a molding method which allows the introduction of extra molding material to the mold cavity after the mold is closed and which allows air or other gases to escape from the mold cavity to insure a reliable splice.

Another object is to provide a molding method which is usually accomplished and which is sufficiently flexible to be used with different cable diameters.

Another aim of the present invention is to provide a molding method which selectively vents gas from the mold cavity to the environment and which allows heated molding material to escape thereby indicating the progression of the molding process.

Other objects and advantages of the invention will appear from the following description taken in conjunction with the accompanying drawings.

BRIEF DESCRIPTION OF THE DRAWINGS

FIG. 1a is a plan view of two cable segments which have been prepared for splicing.

FIG. 1b is a plan view of the cable segments of FIG. 1a after splicing has been completed.

FIG. 2 is a perspective view of an embodiment of a molding apparatus to accomplish the molding method of the present invention in a closed position.

FIG. 3 is a perspective view of the molding apparatus in an opened position.

FIG. 4 is an enlarged plan view of the upper platen of the molding apparatus.

FIG. 5 is a sectional elevational view taken along line 5—5 of FIG. 4.

FIG. 6 is an enlarged elevational view, partly in cross section, of a threaded rod engaging upper and lower platens of the molding apparatus.

FIG. 10 is an exploded perspective view of a taped cable and a premolded boot.

DESCRIPTION OF THE PREFERRED EMBODIMENT

Figure 7:
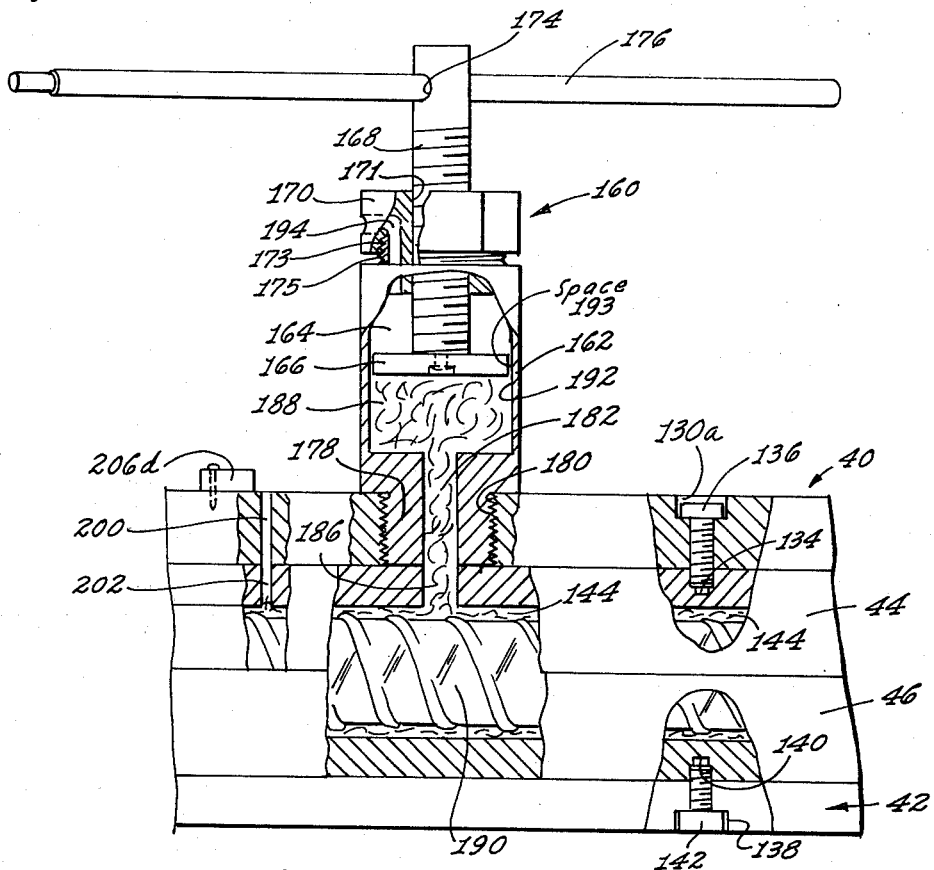
FIG. 7 is an enlarged elevational view, partly in cross section, taken generally along the line 7—7 of FIG. 2.

While the present invention is susceptible of various modifications and alternatives, an illustrative embodiment is herein described in detail. It should be understood, however, that it is not the intention to limit the invention to the particular method disclosed; but, on the contrary, the intention is to cover all modifications, equivalences and alternative methods falling within the spirit and scope of the invention as expressed in the appended claims.

Referring now to FIGS. 1a and 1b, there is illustrated a first electrical cable segment 10 which is to be spliced to a second electrical cable segment 12. Generally, a high voltage electrical cable includes an electrically conductive central core, such as a strand of electrically conductive wire 14, 14' around which is a semi-conductive material, such as ethylene propylene rubber containing lampback 16, 16'. The semi-conductive material is surrounded by a layer 18 of electrically insulative material such as polyethylene, cross-linked polyethylene or ethylene propylene rubber. Surrounding the electrically insulative layer 18 is an electrical shield 20, 20'. The splice is preferably made by joining the stranded electrically conductive wire 14, 14' in any convenient way, such as by crimping within a joining sleeve, or by using a material which when ignited generates a great deal of heat. The joint is then filed smooth. Next, a semi-conductive material is placed about the conductive wire and wrapped or molded so as to achieve a reasonably smooth outer surface 22. Finally, the spliced portion is wrapped with an electrically insulative material such as unvulcanized ethylene propylene rubber. A shield segment is placed within the wrapping connected to the shields 20, 20' to achieve a single shield 20''. The wrapped cable is then placed in a mold cavity where heat and pressure are applied to provide a smooth, securely bonded spliced region. It is to be understood that various electrically insulating materials may be used with the molding apparatus to be described and that what occurs during the molding process is a function of the material used. For example, when polyethylene is molded, it simply flows and reforms to the shape of the mold. Cross-linked polyethylene reforms and undergoes a chemical change when heated as does ethylene propylene rubber. In any case, the insulating material is usually applied to the cable in a tape form; after molding it is desired that the added insulating material be securely bonded to the original insulating material and have the requisite electrical and mechanical characteristics.

As discussed, splicing of high voltage cable in the prior art required that initially the layers of the segments above the conductive wire have a gradual pencil-like taper. The added materials were then carefully taped by hand in a slow, careful manner to establish as good a bond or connection as possible to the conductive wire and existing layers so as to minimize entrapped air. The tape also had to conform closely to the mold cavity that was to be used. But, it was desirable to wrap the tape to a slightly oversized condition so as to force out air or other gas within the splice when the mold applied heat and pressure. However, by forming an oversized cable, the mold could not be completely closed; this created a pressure differential through the opening between the mold halves. Hence, an inherent dilemma developed--trapped air or misalignment problems. Proper molding required a high degree of skill since once heat and pressure were applied, there would be a tendency for the material around the conductive wires to flow outwardly through the opening between the mold halves placing tension on and causing misalignment of the conductive wires. As mentioned, this tension increased the likelihood of damage to the conductive wire which raised the likelihood of a discontinuity and the eventual failure of the cable requiring a new splice attempt. Any effort to avoid this problem by placing less insulative material about the cable tended to increase the chance of entrapped air which also had the effect of creating a discontinuity and eventual failure of the cable. To strike a balance required a high degree of skill and excessive time, thus, increasing costs.

An important aspect of the present invention is the provision of a molding method which is simply formulated and easily operated to obviate the need of highly skilled labor and excessive time. The method can be carried out with a relatively small portable type apparatus to allow convenient field usage. Referring now to FIGS. 2 and 3, one such apparatus comprises an upper platen 40, a lower platen 42 and upper and lower mold forms 44 and 46. The upper platen 40 is articulated by two hinges 48 and 50 so as to allow a portion of the upper platen to be rotated about the hinges without misaligning the upper platen and the lower platen. Precise vertical movement of the upper platen relative the lower platen is achieved by the two guide pins 52 and 54. Vertcial movement is controlled by the use of a threaded rod 56 within a threaded opening 58 of the upper platen and operable by a removable handle 60. The threaded rod is also rotatably received by the lower platen 42.

Connected to a front peripheral surface 70 of the upper platen is a handle 72 for conveniently rotating the upper platen. Rotatably mounted within two recesses 80 and 82 in a front peripheral surface 74 of the lower platen are two threaded fasteners 76 and 78. The fasteners can rotate from a position generally parallel to the lower platen, as shown in FIG. 3, to a position generally perpendicular to the lower platen, as shown in FIG. 2, disposed within recesses 84 and 86, respectively, in the front peripheral surface 70. Positioned to the rear of the molding apparatus is a control box 86 having a control switch 90 and two indicator lights 92 and 94 for indicating to an operator when power is being delivered from a power source 95 to the upper and lower platens respectively. Power cords 96 and 98 lead from the control box 86 to the upper and lower platens, respectively, and connect to cartridge heaters 97 and 99, FIG. 4, which are positioned within the upper and lower platens. Strip heaters may be used in the alternative. The temperature of each of the platens is controlled by control knobs 100 and 102 of the upper and lower platens, respectively, and are moved in response to temperature indications provided by thermometers 104 and 106. The control box 86 is detachable and pivotable to allow usage in tight spaces such as within manholes, for example. By detaching, a smaller width of the apparatus is achieved. Mounted atop the upper platen is a material injection apparatus 108 which is in communcation with the mold cavity formed by the mold forms 44 and 46.

A major advantage of the molding apparatus described is that it is easy to open and close without upsetting a precise alignment of the upper and lower platens and mold forms. In addition, another advantage of the molding apparatus described is its ability to provide facilitated opening and closing while preventing excessive stress concentrations on the platens when the platens are in their closed positions. An important aspect of the present invention is to provide a method which encompasses apparatus capable of handling a variety of mold forms having different cavity mold sizes so as to accommodate varying sizes of electrical cable.

Referring now to FIGS. 4, 5, 6 and 7, there is illustrated in more detail the upper platen 40 which is articulated and comprised of a forward rotatable portion 110 and a rearward vertically translatable portion 112. The rear portion 112 has three openings, openings 114 and 116 to receive the guide pins 52 and 54 and the threaded opening 58 to receive the threaded rod 56. The guide pins are fixed to the lower platen, so that the upper platen is able to move in a vertical direction without changing position in a horizontal plane relative the lower platen. Thus, the insertion and removal of a cable does not require alignment adjustments. Insertion and removal of cables are facilitated by having the front portion 110 of the upper platen selectively rotatable relative the rear portion 112 between open and closed positions. This is accomplished with the relatively simple constructed hinges 48 and 50. For example, the hinge 50 includes a shaft 116 positioned within an opening 118 in a leg 120 of the rear platen portion. The shaft 116 also extends into the front platen portion. The front platen portion is allowed to rotate relative the rear platen portion to a limited extent due to the shape of an outer surface of the leg 120, FIG. 4, which includes an upper rounded portion 122, FIG. 5, and a flat abutment portion 124. The abutment portion abuts a rear surface 126 of the front platen portion to limit the motion of the front platen portion to an aligned closed position as shown in FIG. 5 in solid line, while the round portion 122 allows the front platen portion to rotate to a perpendicular open position, as shown in phantom line in FIG. 5.

The forward portion of the upper platen also includes two parallel series of openings such as the series including the opening 130 and the series including the opening 132. These openings align with openings in the mold form 44, such as the openings 130a and 134 as shown in FIG. 7, and receive threaded fasteners such as the screw 136 to securely fasten the upper mold form to the upper platen. In a similar fashion, openings, such as the opening 138, are provided in the lower platen to align with openings, such as the opening 140, in the lower mold form 46 for receiving fasteners such as the screw 142 to securely fasten the lower mold form to the lower platen. The lower platen and attached lower mold form are relatively stationary, while the upper platen and attached upper mold form are movable between open and closed position as described with reference to FIG. 5. Thus, the platens and the mold forms are in an open position, as shown in FIG. 3, to receive a wrapped splice and to allow removal of a molded splice, and in a closed position as shown in FIG. 2 during the molding process.

AS mentioned hereinabove, to close the platens and the mold forms it is simply necessary to rotate the forward portion 110 to an aligned position with the rearward portion 112. Then, the handle 60, FIG. 1, attached to the threaded rod 56 is rotated to cause the upper mold form to move into engagement with the lower mold form. To prevent cable damage by distortion of the conductive wire, it is very desirable to have a tight fitting, precisely aligned engagement between the upper and lower mold forms so that during the molding process there is no leakage along the region where the mold forms come together, commonly referred to as the parting line, nor is there any shifting of the cable within the mold cavity. Since the force causing the upward and downward movement of the upper platen occurs at the threaded opening 58 which is adjacent a rear peripheral edge 150, FIG. 4, excessive stress concentrations in the upper platen are avoided by having the threaded fasteners 76 and 78 engage the forward portion of the upper platen. Attached to the threaded fasteners are nuts 152 and 154 which may be tightened to bear against washers 156, 158, respectively. Thus, downward forces applied to the upper platen are located at three triangularly disposed locations, adjacent the threaded rod 58, adjacent the threaded fastener 76 and adjacent the threaded fastener 78, to achieve a more even distribution. The even distribution of forces on the platen substantially reduces or eliminates breakage of the upper platen and assures a tight engagement of the upper and lower mold forms.

Another important aspect of the present invention is a provision for allowing the injection of additional material into the mold cavity once the mold forms have been secured in their closed position. One of the major disadvantages of the prior art is overcome since it is no longer necessary to "over pack" the mold cavity. In addition, the apparatus for injecting the additional material allows for the escape of gas, usually air, that may have become entrapped. Still another advantage is that the injecting apparatus provides a controlled way of increasing the pressure within the mold cavity. Referring now to FIGS. 4 and 7, there is illustrated a material injection apparatus 160 comprising a cylindrically shaped housing 162 having an interior space 164 and a piston 166 which is movable vertically within the interior space 164 by the rotation of a threaded rod 168 which is connected to the piston and supported by a cap nut 170 having a threaded opening 171 to receive the threaded rod and a threaded recess 173 to receive a threaded upper portion 175 of the housing. The threaded rod has an opening 174 in its upper portion to receive a cross rod 176 to facilitate the hand rotation of the rod 168 and thereby the vertical movement of the piston. A threaded extension 178 is integral with the housing 162 and extends within an opening 180 in the upper platen providing direct communication between the interior space 164 and a mold cavity 144 via a central opening 182 in the extension 178 and an opening 186 in the upper mold form 44. A slug 188 of insulative material is placed within the interior space 164 and pushed into the mold cavity about the wrapped cable 190.

Upon heating the platens, the material in the mold cavity and within the injection apparatus 160 will begin to soften so that an operator may simply grip the cross rod 176 and rotate it to cause additional material to be injected into the mold cavity. It is to be noted that the piston 166 is of a smaller diameter than the diameter of the interior wall 192 of the housing. This is done so that any air which is entrapped within the additional material 188 may rise and escape through an annular passageway 193 between the piston and the interior wall and through an opening 194 in the nut 170. In addition to the air escape offered by the material injection apparatus, there are a series of openings in the upper platen such as the opening 200, and a series of aligned openings in the upper mold form such as the opening 202 which communicates the mold cavity with the environment. The openings are spaced generally along the longitudinal length of the splice, as shown in FIG. 4, so as to offer convenient air escape routes.

Figure 8:
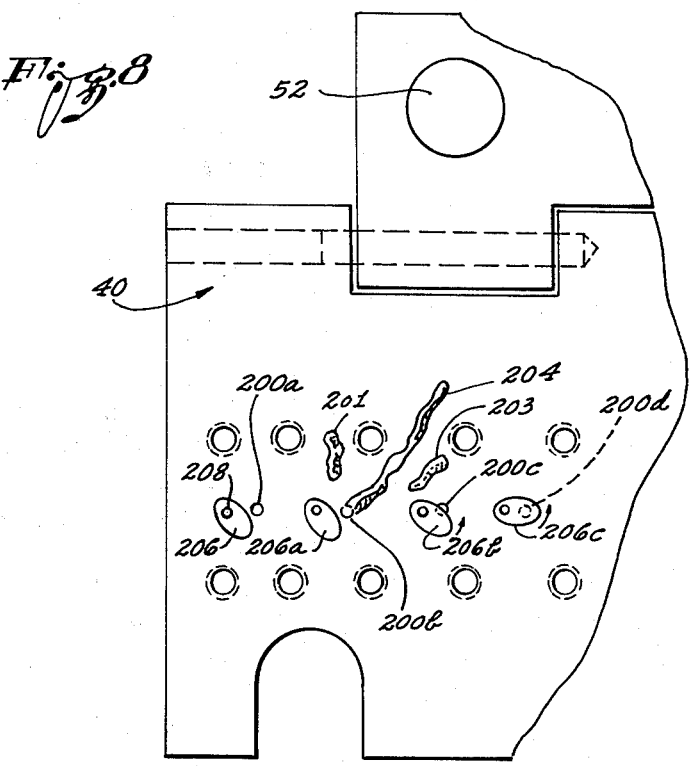
FIG. 8 is an enlarged partial plan view of the upper platen similar to that shown in FIG. 4 for illustrating the adjustable openings of the upper platen.

As the operator rotates the piston downward, he will be given a "feedback" as to the progression of the molding process since the resistance to downward movement of the piston will be a function of the heat input to the mold cavity. Referring now to FIG. 8, the aligned openings through the upper platen and the upper mold form also serve as a feedback device to an operator to determine when enough heat and pressure have been applied to the splice. For example, once a major portion of the gas which was entrapped within the mold cavity has been expelled, some of the heated and softened material in the mold cavity will begin to sputter and ooze through the openings such as illustrated in conjunction with the opening 200b forming segments 201 and 203 and a snake-like filament 204 of material. These filaments also contain entrapped air.

To provide even more control of the molding operation, small rotatable tabs such as the tab 206 adjacent the opening 200a are provided to partially or totally block a corresponding opening so as to allow localized increases in pressure along the longitudinal length of the splice during the molding process. For example, tab 206b is illustrated partially covering opening 200c, while the tab 206c is totally covering the opening 200d. Each of the tabs are pivoted about a pin, such as the pin 208 of the tab 206, and are easily hand rotated by the operator. It is now apparent that a properly bonded splice can be achieved without the usual fear of trapped air, without the need to spend excessive time carefully tapering and then taping the splice, without the fear that the splice may become distorted due to a leakage along the parting line of the mold forms and without the need of highly skilled personnel to operate the molding apparatus.

Figure 9:
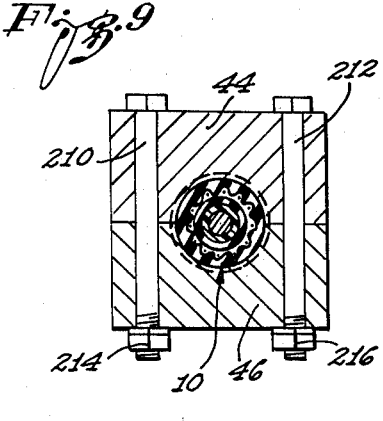
FIG. 9 is an enlarged sectional view of mold forms taken through line 9—9 of FIG. 2.

When as shown in FIG. 2, it is necessary to use mold forms which are longer than the corresponding dimension of the platen. It has been found desirable to clamp the mold form ends so as to insure a tight engagement of the mold forms at their ends in addition to the tight engagement along the central portion insured by the platens. One way of achieving the tight engagement is to provide two elongated bolts 210 and 212, FIG. 9, which are engaged respectively by nuts 214 and 216. These bolts additionally have the effect of reducing the stress on the platens and their supporting members caused by the pressure within the mold.

In performing the method of the present invention, an operator bears a small portion of the conductive wire of the cables to be spliced, welds the conductive wires together and then applies an insulative material to cover the wires, such as by having a tape of a material identical to the insulative layer of the cable or compatible with this layer so as to insure bonding. The material is applied about the sliced region so as to fully cover the conductive elements and be slightly undersized when compared with the mold cavity to be used. The molding apparatus is prepared by determining which size mold forms to use and tightly securing each of the mold forms to their respective platens. The platens and the mold forms are then moved to their opened positions to receive the wrapped cable and initiate the molding operation. It is noted as illustrated in FIG. 3 that the end portions of the mold forms may have internal serrations 220 to more securely grip the cables and prevent movement during the molding operation provided the insulative material used is one that will return to a smooth outer surface when removed from the molding apparatus. It has been found desirable to wrap a layer of linen tape about the cable portions which contact the mold forms to allow the cable to expand during the molding operation without injuring, to preserve pressure within the mold cavity and yet block the escape of the oozing insulative material, to protect the existing insulative covering from excessive heat and to provide a porous opening during the initial portion of the molding operation to serve as another escape route for any entrapped gas.

The platens and mold forms are then moved to their closed position with the threaded rod 56 being rotated to cause a tight engagement between the upper and lower mold forms. The threaded fasteners 76 and 78 are then moved into place (as shown in FIG. 2) and the washers 156 and 158 caused to bear against the upper surface of the upper platen, so that a reasonably even distribution of force is applied to the upper platen insuring a tight closure of the mold forms. If the mold forms extend beyond the platens, clamps may be provided, such as the bolt-nut combinations of FIG. 9. Next, the control switch 90 is activated so as to energize the heating elements within the platen. The slug 188 of additional material is deposited into the injection apparatus 160 to await heating.

Temperature control of the platens is made by a suitable setting of the knobs 100 and 102 with feedback to the operator setting being supplied by the thermometers 104 and 106. Once the unmolded tape material within the mold cavity and within the injection apparatus has been heated sufficiently enough to flow, the operator may begin lowering the piston 166 to cause the additional insulative material to enter the mold cavity. As explained earlier, any entrapped gas is allowed to escape through the injection apparatus, through the aligned openings in the upper mold forms and the upper platen, and longitudinally through the ends of the mold forms. Meanwhile, pressure is created by the heating process and by the operator forcing the additional material from the injection apparatus into the mold cavity. By way of example when ethylene propylene rubber (EPR) is used as the insulative material, the cable is heated to about 250°F. to allow the EPR to flow and form in the shape of the mold cavity. The injection apparatus may then be removed and replaced with a thread plug (not shown) or kept in place, while the temperature of the cable is raised to about 300°F. to cure the material. Cure time is between 5 and 30 minutes depending upon the material used. The actual temperature of the platens depends upon the size of the cable, the mold forms and the conductive core.

The operator will be able to gauge the progression of the molding operation by the resistance to the injection of the added material and by observing the opening 200. The length of the filaments coming through the openings of the upper platen will also indicate whether it is desirable to increase pressure locally along the splice by moving a tab over its corresponding opening, as shown in FIG. 8. By restricting the opening, there will be a buildup of pressure in the region of the mold cavity adjacent the opening thereby giving the operator a great deal of flexibility in achieving a reliable bond.

If a semi-conductive material is used about the conductive wires, then it may be necessary to perform the molding operation twice, first to bond the semi-conductive material about the conductive core and second to bond the insulative material about the semi-conductive material.

As an alternative to completely wrapping the insulative material around the cable, a premolded "boot" may be used. Boots are simply insulative material premolded to the size and shape of the mold cavity. Referring to FIG. 10, a cable 300 has a partial wrap of insulative tape 302 placed around it. A boot 306 having a hollow interior 308 and a longitudinal slit 310 is positioned about the wrapped portion. The conductive elements are wrapped with only enough unvulcanized material to be a snug fit inside the boot. The slot is placed in an upward position in the mold cavity so that the added material introduced by the injection apparatus flows into the slot and fills the region within the boot. The boot offers the advantage of saving wrapping time and, importantly, insures the concentricity of the conductive core since the premolded boot acts as a precise spacer.

It is apparent that the present molding method is greatly superior to the methods heretofore available. Not only are highly skilled technicians obviated, but highly reliable splices can be achieved within a relatively short period of time so as to establish a tremendous economic advantage.

For further purposes of illustrtion, the molding method and apparatus described may be used with many materials, the following are just a specific few:

neoprene, rubber, ethylene propylene rubber, polyvinyl chloride, polyurethane, cross-linked polyethylene, silicone and polyethylene. In addition to splicing electrical cable, the molding method and apparatus may be used to splice air hoses, make molded rubber parts and encapsulated electrical components. One particular embodiment of a molding apparatus which may be used to carry out the inventive method has an available molding area of 20 inches by 7 inches, has a maximum power requirement of 1,600 watts at 115/230 volts and 50/50 Hz. The platens are capable of a temperature range of between 150° to 420°F. and approximate preheat time is 13 minutes. By way of comparison to illustrate another advantage of the present invention, a typical conventional taped splice of a 69 Kv cable has a diameter of 5 inches and is about 48 inches long. A splice of the same cable made according to the teachings herein would have a diameter of 3⅛ inches and be about 13 inches long. Preferably, the platens and the mold forms are of aluminum alloy, so that the weight of the unit described is approximately 40 pounds. It is, of course, understood that smaller molding apparatus may be constructed weighing as little as 12 pounds. It is to be understood that low voltage cables may be reliably spliced with the apparatus described and that the insulative material may be wrapped in tape form, boot form of sheet form, for example. Additionally, Y and T splices can be easily achieved simply by providing the proper mold forms. In the past, such splices were not performed because of the inability to hand tape a smooth, waterproof wrap at the corners of the Y and T.

I claim:

1. A method for insulating high voltage electrical cable comprising the steps of:
   providing an elongate mold for placement over a portion of the cable, the mold defining an elongate cavity and including a plurality of relatively small apertures communicating the cavity with the exterior, the apertures being spaced over at least a portion of the length of the cavity;
   placing said cable within the mold cavity;
   forcing a moldable, electrically insulating vulcanizable material into said mold cavity by applying pressure to the material to thereby flow it into the cavity;
   maintaining the apertures in their open position during the forcing step to thereby vent insulating material and entrapped gas from the mold cavity;
   closing at least some of the apertures to facilitate the propagation of the material and of the pressure throughout the cavity;
   heating the material sufficiently to vulcanize it at an elevated temperature; and
   maintaining the elevated temperature and the elevated pressure for a sufficient time to establish a bond between the material and the existing insulation on the cable along their interface.

2. A method for the in-the-field insulation of a high voltage electrical cable having a relatively short section of a non-insulated conductor and, contiguous therewith, existing cable insulation material selected from the class consisting of polyethylene, cross-linked polyethylene and ethylene propylene rubber, the method comprising the steps of:
   providing an elongate mold for placement over the uninsulated cable section the mold defining an elongate cavity to be centered over the section, openings through which the cable extends from the cavity to the exterior of the mold, and a plurality of relatively small apertures communicating the cavity with the exterior, the apertures being spaced over the length of the cavity;
   placing the section of the cable within the mold cavity;
   filling the cavity surrounding the section with a vulcanizable rubber;
   applying pressure to the rubber in the mold;
   closing the apertures at least after the cavity has been filled with the rubber;
   closing the cavity against fluid communication between the cavity and the exterior thereof via the openings in the mold;
   heating the rubber in the cavity while the apertures are closed to above its vulcanizing temperature; and
   continuing the heating and pressuring steps for a sufficient time to interface the rubber and the existing cable insulating material;
   whereby a bond between the rubber and the insulating material of the cable along their interface is established.

* * * * *